April 19, 1960 B. I. BUCK 2,933,115
TOMATO TRIMMING MACHINE
Filed March 30, 1954 5 Sheets-Sheet 1
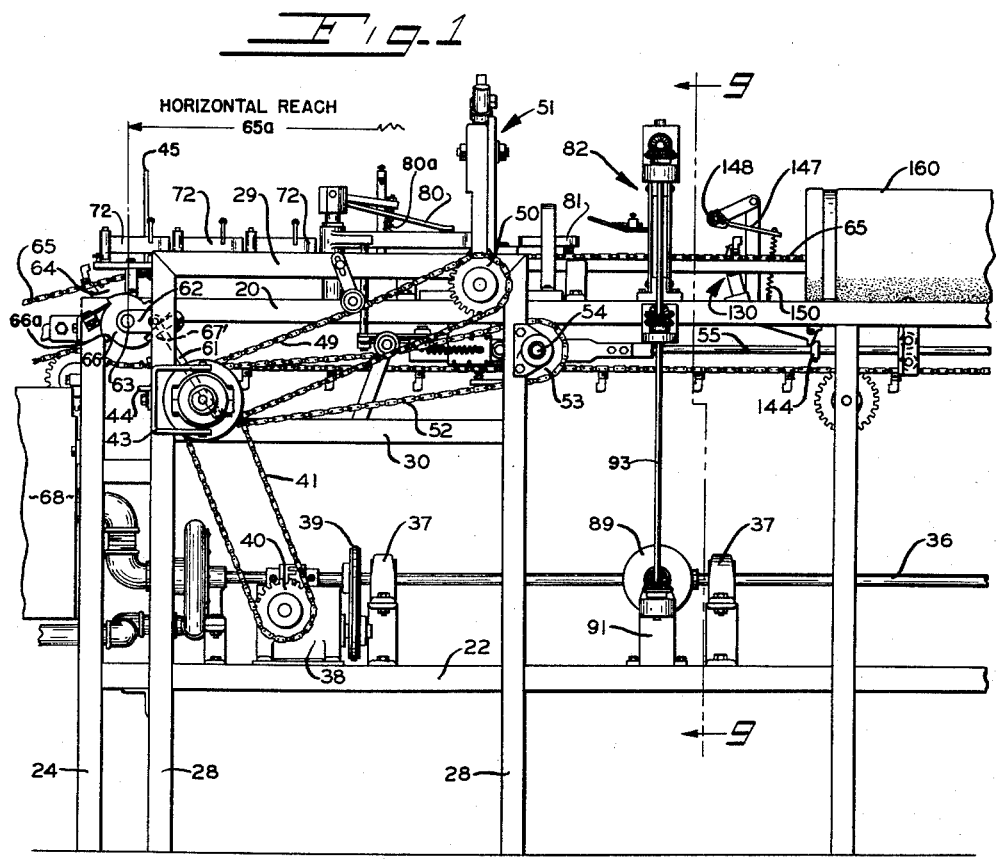
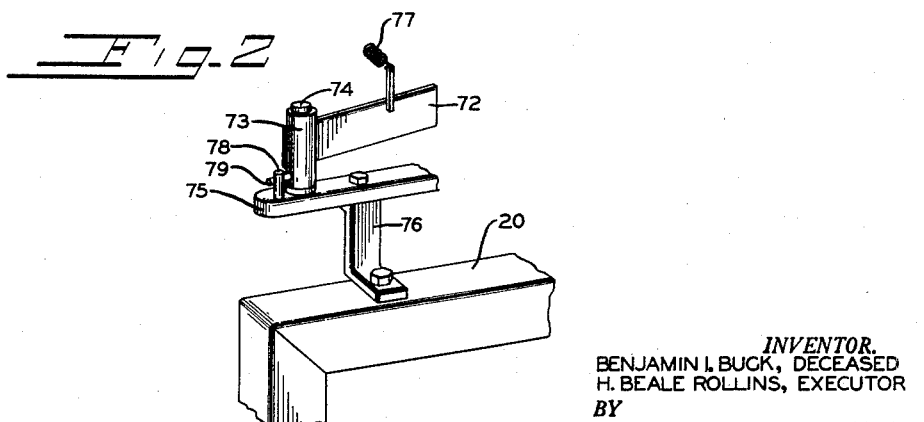
*INVENTOR.*
BENJAMIN I. BUCK, DECEASED
H. BEALE ROLLINS, EXECUTOR
*BY*
DESJARDINS, ROBINSON & KEISER
HIS ATTORNEYS

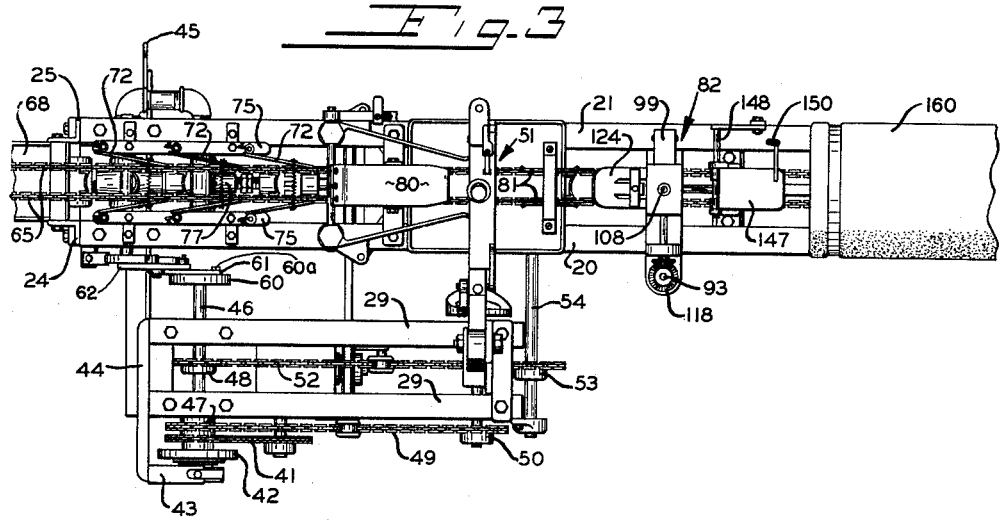
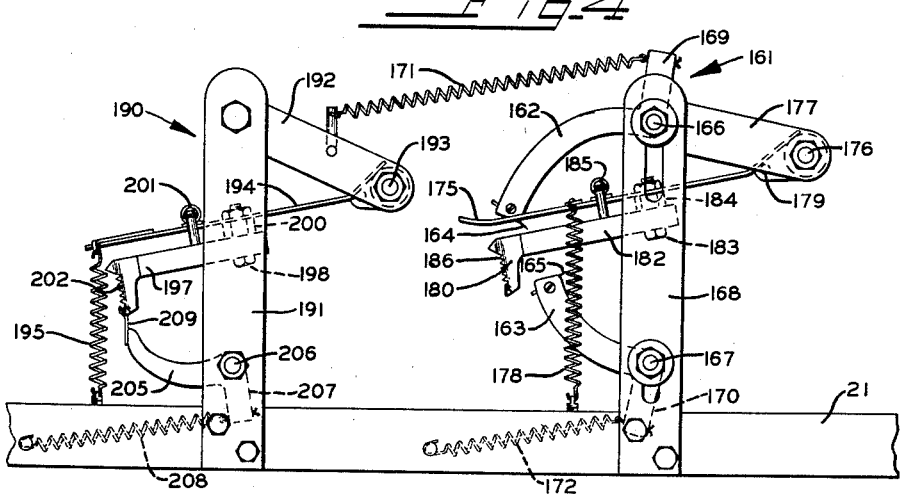
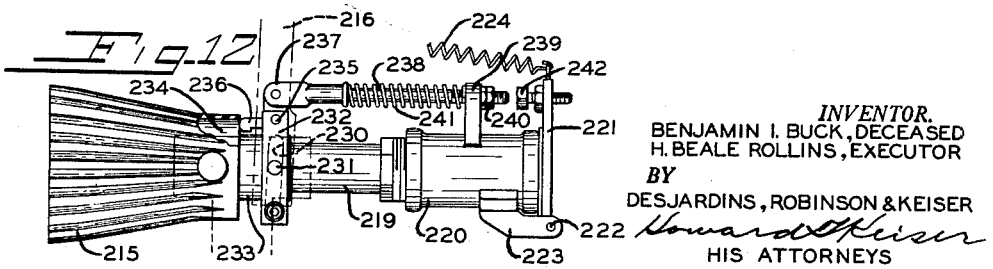

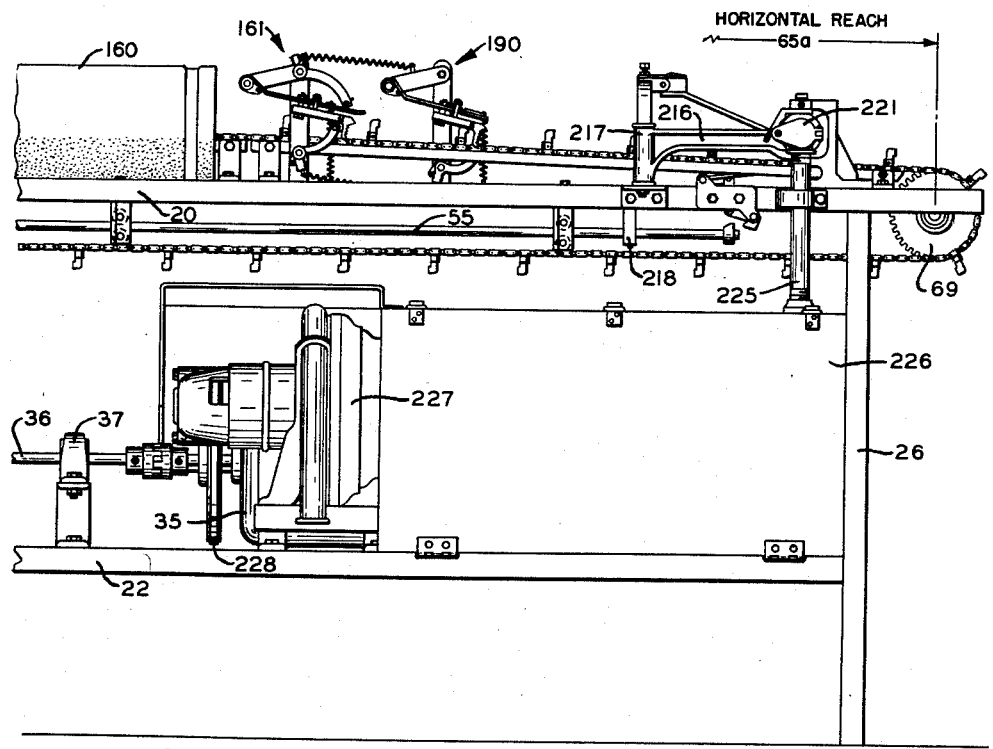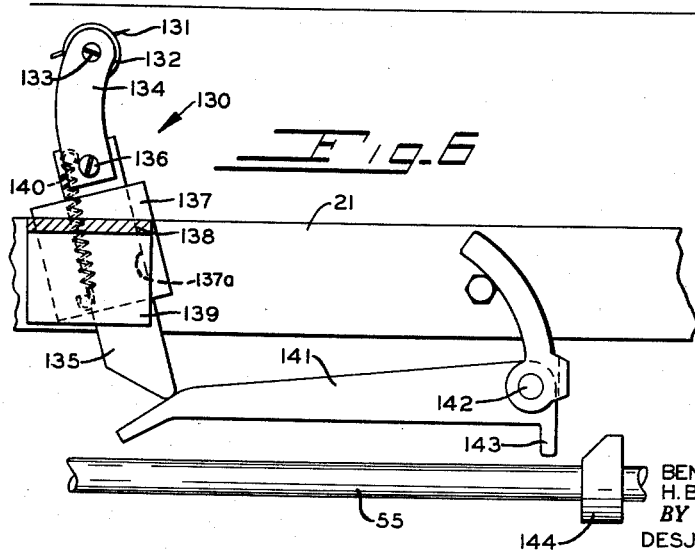

April 19, 1960 B. I. BUCK 2,933,115
TOMATO TRIMMING MACHINE
Filed March 30, 1954 5 Sheets-Sheet 4
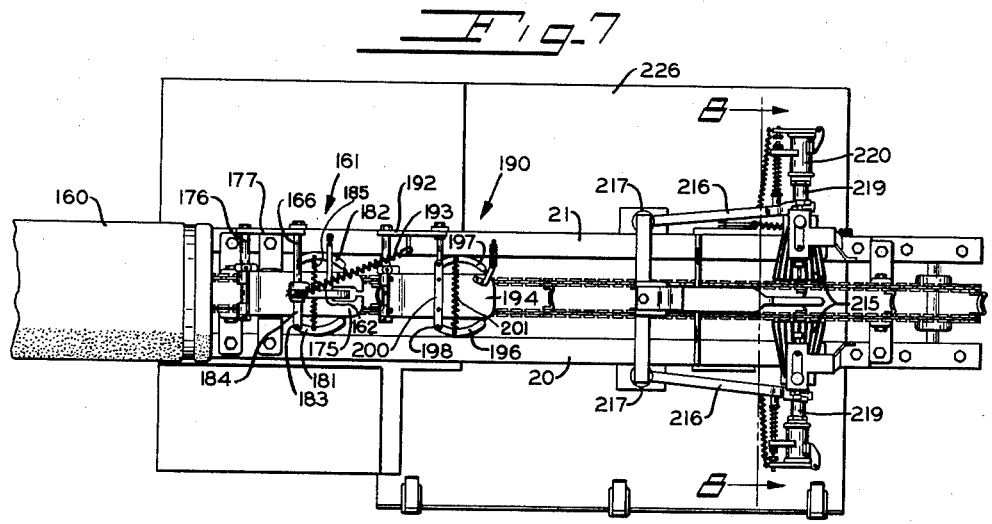
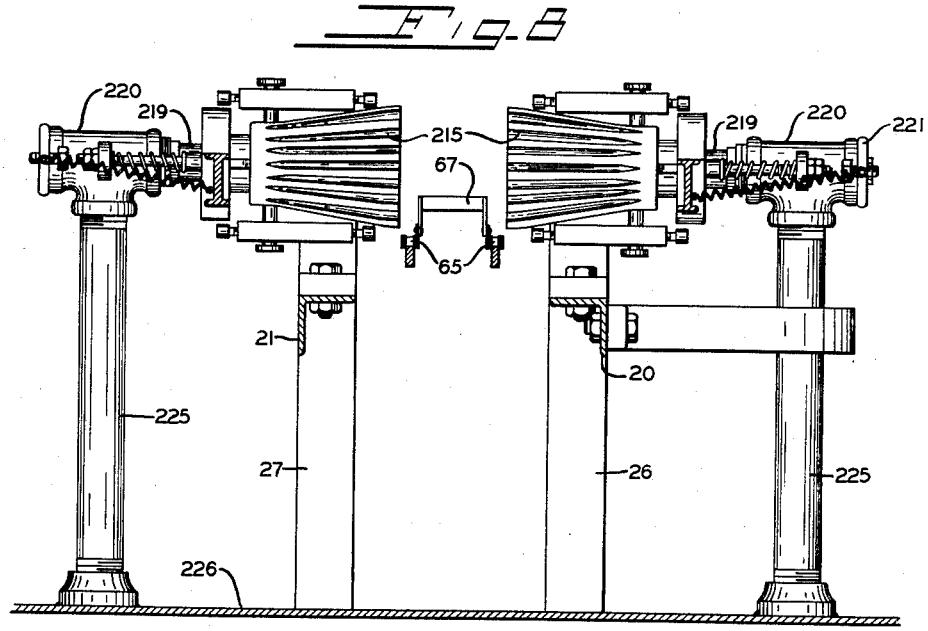
INVENTOR.
BENJAMIN I. BUCK, DECEASED
H. BEALE ROLLINS, EXECUTOR
BY
DESJARDINS, ROBINSON & KEISER
HIS ATTORNEYS April 19, 1960
B. I. BUCK
2,933,115
TOMATO TRIMMING MACHINE
Filed March 30, 1954
5 Sheets-Sheet 5
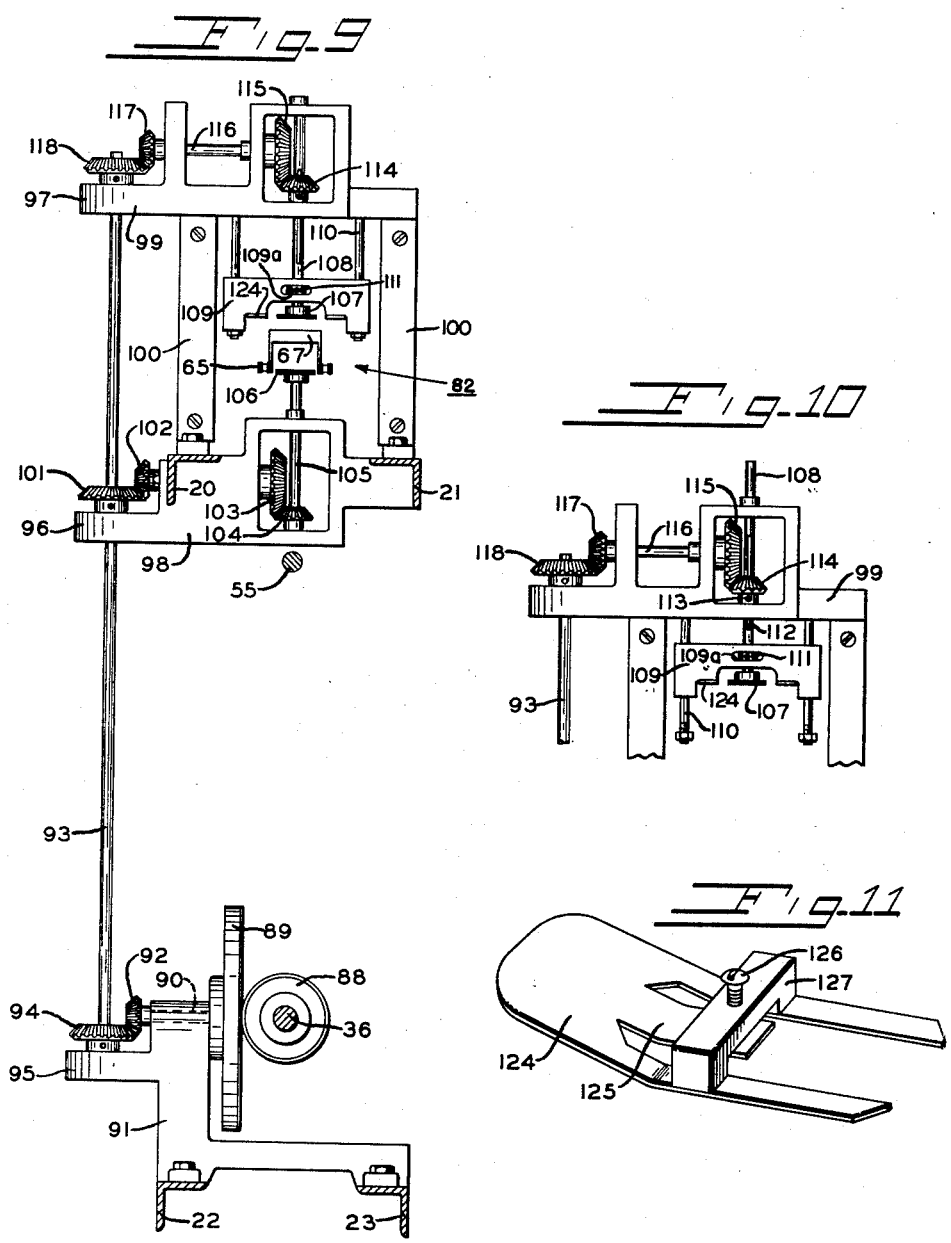
INVENTOR.
BENJAMIN I. BUCK, DECEASED
H. BEALE ROLLINS, EXECUTOR
BY
DESJARDINS, ROBINSON & KEISER
HIS ATTORNEYS

United States Patent Office 2,933,115
Patented Apr. 19, 1960

2,933,115

TOMATO TRIMMING MACHINE

Benjamin I. Buck, deceased, late of Baltimore, Md., by H. Beale Rollins, executor, Baltimore, Md., assignor of one-half to H. Beale Rollins, Baltimore, Md.

Application March 30, 1954, Serial No. 419,713

9 Claims. (Cl. 146—81)

This invention relates to improvements in tomato skinning machines and has to do, more particularly, with improved means in such machines for preparing the tomato for the skin removal step and for improving the vacuum operated apparatus for effecting removal of the skin.

This case is a continuation-in-part of application Serial No. 212,560, filed February 24, 1951 (now Patent 2,703,124, dated March 1, 1955).

As fully disclosed in the above-mentioned patent, the improved tomato skinning machine includes a device for automatically loading the tomatoes on a conveyor in spaced relation with ther stem ends uppermost. This device includes an upwardly inclined reach of the conveyor, the lower end of which is submerged in a float tank into which the tomatoes are dumped preparatory to being cored and skinned. As the tomatoes float in the tank, they are picked up by the flights on the conveyor which lift them from the water and carry them to the horizontal portion of the conveyor on which they are transported to the processing apparatus of the machine. Intermittent drive means is provided for operating the conveyor so that the tomatoes are moved in a step-by-step manner through the machine. As the tomatoes proceed seriatim through the machine, the stem section of each tomato is removed by a coring knife. Thereafter, the tomatoes pass between upper and lower rotary knives which remove slices of uniform thickness from the top and bottom of the fruit. A reciprocating needle type slitter then slits the skin of each tomato along a meridian line on the posterior face thereof. The tomatoes then pass into a steam chamber where they are steamed to loosen the skin. Upon leaving the steam chamber, the tomatoes are preferably subjected to a spray of cold water to loosen the skin and facilitate its removal. The tomatoes are next slit along a meridian line on the anterior face thereof and simultaneously subjected to the scraping action of a pair of scrapers which excoriate the tomatoes on either side from front to rear to loosen and partially remove the skin. The tomatoes are preferably subjected to a second set of scrapers which also includes a bottom scraper as well as the side scrapers after which the tomatoes are subjected to the action of suction cups which complete the removal of the skin. The skinned and cored tomatoes are thereafter delivered by the conveyor to any suitable receiving means.

Accordingly, one of the objects of the invention is to provide improved means for removing slices of predetermined thickness from the top and bottom of each tomato as it passes through the machine.

Another object of the invention is to provide improved slicing knives, and power drive means therefor, for efficiently removing top and bottom slices from each tomato passing through the machine.

Another object of the invention is to provide means for preventing tilting of the tomatoes on the conveyor as they move from the upwardly inclined reach thereof to the horizontal reach on which they are carried through the machine.

Another object of the invention is to provide a power operated device for slitting the posterior face of each tomato along a meridian line before it reaches the suction cups which effect removal of the skin.

Another object of the invention is to provide means for simultaneously slitting the anterior face of each tomato along a meridian line and for scraping loose the skin on both sides of the tomato to partially remove the same.

Another object of the invention is to provide means for scraping loose the skin of the tomatoes before they reach the suction-actuated skin removing devices.

Another object of the invention is to break the suction applied by the suction cups to the sides of the tomatoes when the cups are retracted so as to prevent the tomatoes being pulled off the conveyor.

Another object of the invention is to reduce the length of the suction pipe connecting the cup with the source of vacuum to a minimum so as to likewise reduce the "build-up" time of the vacuum when the cups are applied to a tomato situated therebetween.

With these and other objects in view, which will become apparent from the following description the invention includes certain novel features of construction and combinations of parts, the essential elements of which are set forth in the appended claims and preferred form or embodiment of which will hereinafter be described with reference to the drawings which accompany and form a part of this specification.

In the drawings:

Fig. 1 is a side elevation of the forward end of the improved tomato coring and skinning machine.

Fig. 2 is an enlarged fragmentary, perspective view of one of the restraining plates for preventing tilting of the tomatoes on the conveyor.

Fig. 3 is a top plan view of the forward end of the machine shown in Fig. 1.

Fig. 4 is an enlarged left side elevation showing the slitting and scraping devices located to the rear of the steaming chamber.

Fig. 5 is a side elevation of the rear end of the improved machine.

Fig. 6 is a right side elevation of the power slitter located immediately ahead of the steaming chamber.

Fig. 7 is a top plan view of the rear end of the machine.

Fig. 8 is an enlarged cross-sectional view taken along the line 8—8 in Fig. 7.

Fig. 9 is an enlarged cross-sectional view taken along the line 9—9 in Fig. 1.

Fig. 10 is a view showing a portion of the mechanism illustrated in Fig. 9 in a moved position.

Fig. 11 is an enlarged perspective view of the gauge plate for the rotary slicing knives.

Fig. 12 is an enlarged top plan view of one of the suction devices.

Referring now to the drawings in which like reference numerals designate like parts of the machine, the various operating mechanisms of the machine are supported by a main frame including a pair of spaced top rails 20 and 21 (Figs. 1 and 3) and a pair of bottom rails 22 and 23 (Figs. 1 and 9) which lie directly beneath the rails 20 and 21, respectively, and, like those rails, extend throughout the length of the machine. The four above-enumerated rails extend between a pair of front posts or legs 24 and 25 (Figs. 1 and 3) and a similar pair of rear legs 26 and 27 (Figs. 5 and 8). Several pairs of intermediate legs are preferably spaced along the length of the machine between the two pairs of end legs so as to lend rigidity to the frame. At the forward end of the machine there is also provided a sub-frame lying off to the right of the machine and including four upright posts or legs 28 (Fig. 1), a pair of top rails 29 (Fig. 3) and a pair of intermediate rails 30 (Fig. 1).

Power for the machine is supplied from an electric motor 35 (Fig. 5) which is supported on the bottom rails 22 and 23 and is connected to a drive shaft 36 journaled in bearings 37 (Figs. 1 and 5) which are supported on the rails 22 and 23. The shaft 36 drives a speed reducer 38 by means of a V-belt drive 39 (Fig. 1). The output shaft of the speed reducer 38 carries a sprocket 40 which, through a chain 41, drives a sprocket connected to the driving side of a clutch 42 (Fig. 3). The clutch 42 can be rendered operative or inoperative by a shifting fork 43 which is connected by a horizontal bar 44 with an operating handle 45. By moving the handle 45 inwardly toward the frame of the machine, the clutch is rendered inoperative, whereas by moving it outwardly, it is rendered operative to drive a shaft 46 (Fig. 3) on which a pair of sprockets 47 and 48 are fixed. Sprocket 47 is connected by a chain 49 with a sprocket 50 for operating the coring device 51 of the machine. This device forms no part of the present invention and, therefore, is not detailed in the present drawings. For the purposes of this disclosure it may be identical with the coring device shown and described in Patent 2,703,124. Sprocket 48 is connected by a chain 52 with a sprocket 53 fast on an operating shaft 54 which corresponds with the operating shaft 62 shown and described in Patent 2,703,124, and, like that shaft operates to reciprocate an operating rod 55 once on each cycle of the machine.

The inner end of the shaft 46 carries a disc 60 on which is mounted an eccentrically located pin 60a (Fig. 3) which is connected by a link 61 to an arm 62 (Fig. 1) which is pivoted at one end on a shaft 63 which carries a pair of sprockets 64 that drive a pair of conveyor chains 65. Also secured to the shaft 63 is a ratchet wheel 66 provided with four teeth 66a disposed at equal intervals about its periphery. The teeth of the ratchet are adapted to be engaged by a pawl 67' which is pivoted to the free end of the arm 62.

This pawl and ratchet mechanism provides an intermittent drive for the conveyor 65 so that the tomatoes carried thereby will be advanced step-by-step to the various operating mechanisms of the machine. It will also be seen that the conveyor will be given one step of forward movement for each reciprocation of the rod 55 which constitutes one machine cycle.

The endless chains 65 of the conveyor are arranged side by side in a spaced-apart parallel relation and are connected at evenly spaced intervals by transverse flights 67 (Fig. 8) which form a plurality of tomato-receiving pockets along the conveyor. These flights pick up the tomatoes floating about in the water of a receiving tank 68 (Fig. 1) which is fully shown and described in Patent 2,703,124. This tank forms no part of the present invention and, therefore, has not been included in the drawings.

Upon reaching the sprockets 64, the chains 65 enter upon a horizontal reach 65a extending the full length of the machine from sprockets 64 (Fig. 1) to a rear sprocket 69 (Fig. 5). Since the conveyor chains are inclined when they pick up the tomatoes out of the water in the tank 68, and the tomatoes are floating with their stem ends uppermost, the axis of the tomatoes will not be exactly normal to the conveyor chains and, when they start down the horizontal reach, the stem ends will be slightly advanced with respect to the blossom ends of tomatoes. Accordingly, there will be a tendency for the tomatoes to rock forward away from the flights 67 each time the conveyor stops. In order to restrain this rocking movement and to assist in straightening the tomatoes on the conveyor, three pairs of restraining plates 72 (Figs. 1 and 2) are provided. As best shown in Fig. 2, each plate 72 is secured to a sleeve 73 journaled on an upstanding post or pin 74. The pins 74 are, in turn, supported on a pair of bars 75 carried by brackets 76 fastened to the top rails 20 and 21. Each pair of plates 72 is provided with a biasing spring 77 for urging the free ends of the plates together to the extent permitted by stop pins 78 (Fig. 2) which cooperate with pins 79 projecting from sleeves 73. As shown in Fig. 3, there are three sets or pairs of restraining plates 72, the spacing between each adjacent pair of plates in the direction of travel of the conveyor being approximately equal to the spacing between adjacent flights 67. Also, the length of the plates 72 is such that, as the tomatoes travel along the conveyor, they will be resiliently urged against the seats formed by the flights 67 substantially continuously while traversing the initial portion of the horizontal reach of the conveyor. The three pairs of restraining plates are also preferably so located along the length of the conveyor as to each have a tomato disposed between the free ends of the plates each time the conveyor stops.

After leaving the restraining plates 72, the tomatoes next move beneath a pressure plate 80 having biasing spring 80a, as illustrated and described in Buck Patent 2,703,124, which further assures vertical alignment of the tomatoes before they reach the coring device 51 where the stem portion of each tomato is removed. After being cored the tomatoes pass between a pair of side pressure plates 81 which are resiliently urged into contact with the sides of the tomatoes as they come to rest while passing from the coring device to the rotary slicing knives indicated generally by reference numeral 82. Here a slice of uniform thickness is removed from the top and bottom of the tomato by upper and lower knives driven from the power shaft 36. As shown in Fig. 9, the shaft 36 carries a friction wheel 88 the periphery of which is in frictional engagement with the face of a driven wheel 89 fast on one end of a shaft 90. The friction wheel 88 may be shifted radially of the driven wheel 89, or in the direction of the axis of shaft 36, so that the speed of the shaft 90 may be controlled as desired by shifting the friction wheel 88. This shifting of the friction wheel 88 is effected by being longitudinally adjustable on the shaft 36. The shaft 90 is journaled in a frame member 91 which is bolted to the bottom rails 22 and 23 as indicated in Fig. 9. A bevel gear 92 fast on shaft 90 drives a vertical jackshaft 93 through a bevel gear 94 meshing with the gear 92. The bottom of the shaft 93 is journaled in a lug 95 projecting from the frame member 91 while the upper end of the shaft is journaled in similar lugs 96 and 97 projecting from frame members 98 and 99. The frame member 98 is secured to the top rails 20 and 21 while the frame member 99 is supported by legs 100 projecting upwardly from these rails. Secured to the jackshaft 93 just above the lug 96 is a bevel gear 101 which meshes with the bevel gear 102 secured to a stub shaft journaled in the frame member 98. On the other end of the stub shaft is a bevel gear 103 which meshes with a bevel gear 104 fast on a vertical shaft 105. The shaft 105 is journaled in suitable bearings provided therefor in the member 98 and has mounted on its upper end a rotary knife 106 preferably constructed of stainless steel to better resist the corrosive effect of the acid juice from the tomatoes. As shown in Fig. 9, the bottom knife 106 lies between the chains 65 of the conveyor and operates to remove a slice of uniform thickness from the bottoms of tomatoes carried by the conveyor. A top slice is adapted to be removed from the top of each tomato simultaneously with removal of the bottom slice by the knife 106. This is effected by an upper knife 107 which is similar to the knife 106 and is secured to the lower end of a shaft 108. The shaft 108 passes through a bore provided therefor in a block 109 (Fig. 10) mounted for vertical sliding movement on a pair of rods 110 depending from the frame member 99. The knife 107 and shaft 108 are constrained to move with the block 109 by virtue of a collar 111 which is confined within a slot 109a provided therefor within the block and which is provided with means for securing it to the shaft 108. The shaft 108 is journaled in the upper frame member 99 and is provided with a keyway 112 which receives a pin 113 carried by a bevel gear 114. Thus, the gear 114 is slidably but non-rotatably mounted on the shaft 108. Meshing with the gear 114 is a spur gear 115 secured to the inner end of a shaft 116 journaled in the frame member 99. On the outer end of the shaft 116 is secured a bevel gear 117 which meshes with bevel gear 118 secured to the upper end of the jackshaft 93. Hence, the upper knife 107 is mounted for up and down movement with power continuously supplied thereto in all positions of the lock 109.

The thickness of the slice removed from the top of the tomato is controlled by a gauge plate 124 (Figs. 3 and 11). The gauge plate is provided with an adjustable center tongue 125 which can be raised or lowered relative to the plane of the plate by means of an adjusting screw 126 which is threaded into a cross bar 127 extending from one side of the plate 124 to the other. The forward end of the plate 124 is turned upwardly as shown in Fig. 11 so as to present an inclined face to tomatoes approaching it on the conveyor. Accordingly, each tomato approaching the knives will cam the plate 124 upwardly and along with it the block 109 and rotary knife 107. The tongue 125 is formed to lie above the plane of the plate and, since it is this tongue which contacts the top of the tomato as the latter passes therebeneath, the knife will lie somewhat below the top of the tomato so as to remove a slice therefrom. This slice may be made thicker by elevating the tongue by adjusting screw 126, or thinner by lowering the tongue so as to move the latter toward the plane of the gauge and knife. After the tomato has passed through the knives, the knife 107 will drop down to its normal, inactive position as shown in Fig. 9.

After passing between the slicing knives, the tomato will move into position above a power slitter indicated generally by reference numeral 130 (Figs. 1 and 6). As best shown in Fig. 6, this slitter comprises a pointed needle 131 which is clamped between a pair of washers 132 by a screw 133 passing between the upper ends of extension plates 134. These plates are secured to the upper end of a flat bar 135 by a screw 136. The bar is guided for rectilinear sliding movement in a guide block 137 having a slot 137a. The block 137 is supported midway between the rails 20 and 21 by transverse supporting members 138 and a pair of spaced supporting plates 139. The block 137 is inclined with respect to the vertical so as to cause the needle 131 to partake of backward movement as it is elevated against the tension of a retracting spring 140. The slide 135 is adapted to be elevated by an operating lever 141 which is pivoted for rocking movement about a pin 142 suspended from the rails 20 and 21. The lever 141 has a nose 143 formed thereon which is adapted to be engaged by a block 144 secured to the operating rod 55. As disclosed in Patent 2,703,124, the operating rod 55 (Fig. 1) is actuated from cams on shaft 54 thereby synchronizing the movement of the rod with the operation of the conveyor 65. The cam arrangement is such that the rod 55 is caused to move forwardly from its Fig. 6 position to its Fig. 1 position, and then return, once during each period of rest of the conveyor chain. Hence, the slitting needle 131 will be raised and lowered during the interval in which a tomato remains positioned adjacent the slitter. During this slitting operation of the posterior face of the tomato by needle 131, the tomato is held down by a pressure plate 147 (Fig. 1) which is pivoted on a rod 148 supported horizontally above the conveyor chain and urged downwardly into engagement with the tomato by a spring 150. Any conventional means may be provided for preventing undue downward movement of the plate under the influence of its spring when no tomato is therebeneath.

After the posterior face of the tomato has been slit by the slitter 130, the tomato is next carried through a steaming chamber 160 where the skin is loosened from the flesh of the tomato by the action of steam. The internal construction of the chamber 160 is completely shown and described in Patent 2,703,124 to which reference may be had for an understanding of the same.

After leaving the steaming chamber 160, the tomato next encounters a slitting and scraping device indicated generally by reference numeral 161 (Figs. 4, 5 and 7). As best shown in Fig. 4, this device includes an upper slitting arm 162 and a lower slitting arm 163 both of which have provision on their outer ends for mounting slitting elements 164 and 165, respectively, which, in the present instance, take the form of sharp, pointed needles. The two axle bolts 166 are fastened at their ends on a stanchion 168 which, in turn, is secured to the top rail 21 of the machine frame. The arms 162 and 163 are provided with crank arms 169 and 170, respectively, to which are secured tension springs 171 and 172, respectively, for resiliently urging the free ends of the arms 162 and 163 toward the positions shown in Fig. 4, this being the normal positions of the arms when no tomato is passing through the slitting device 161.

To steady the tomato on the conveyor as it passes through the slitting device 161, a pressure plate 175 is positioned above the conveyor and supported at one end for rotation about a horizontal axis so that the free end of the plate may be caused to resiliently bear against the top of the tomato. As shown in Fig. 4, the plate 175 is pivoted at one end on an axle bolt 176 fastened at one end to an arm 177 secured to the upper end of the stanchion 168. A tension spring 178 stretched between the plate 175 and the frame of the machine resiliently urges the free end of the plate downward to the extent permitted by a suitable limit stop 179. The plate 175 is suitably apertured, as shown in Fig. 7, to permit the end of the slitting arm 162 to pass therethrough.

In conjunction with the slitting of the skin of the tomato on the anterior face thereof as it passes through the device 161, means is provided for applying a scraping action to the sides of the tomato to thereby loosen the sections of the skin on either side thereof from the flesh of the tomato. For this purpose, scrapers 180 are mounted on the free ends of scraper arms 181 and 182 (see also Fig. 7) journaled on pivot bolts 183 which are carried on opposite ends of a transverse bar 184 carried by the pressure plate 175. The arms 181 and 182 are connected by a tension spring 185 which resiliently biases the scrapers 180 toward one another and toward the sides of a tomato passing through the device. The scrapers 180 are provided with serrations or teeth 186 to cause excoriation of the tomato skin as it passes through the device 161.

After leaving the slitting and scraping device 161, the tomato next passes through a scraping device 190 where a further scraping action on the skin of the tomato is effected. This device includes a stanchion 191 mounted on the rail 21 and, supporting at its upper end, a projecting arm 192 to which is fastened an axle bolt 193. Pivoted on the axle bolt is a pressure plate 194 which is urged downwardly by a spring 195 tensioned between the plate and the frame of the machine. The pressure plate 194, like the pressure plate 175, carries a pair of pivoted scraper arms designated by reference numerals 196 and 197. These arms are pivoted on bolts 198 supported in the opposite ends of a transverse bar 200 secured to the pressure plate 194. The arms 196 and 197 are resiliently urged toward one another by a tension spring 201 stretched therebetween so as to resiliently urge scrapers 202, mounted on the ends of the scraper arms, into engagement with the sides of tomatoes passing through the device 190.

To provide a scraping action on the bottom of tomatoes passing along the conveyor, the device 190 is provided with a third scraping arm 205 which is pivotally supported upon an axle bolt 206 fastened to the stanchion 191. The arm 205 is provided with a crank extension 207 to which is fastened one end of a spring 208 the other end of which is fastened to the machine frame. This spring causes the arm 205 to be urged clockwise as viewed in Fig. 4 to thereby cause a scraper 209 mounted on the free end of the arm to be urged into contact with the bottom of each tomato which passes through the device 190. Hence, the bottom as well as both sides of the tomato will be subjected to the scraping action of the three scrapers incorporated in the device 190 thereby promoting removal of the loosened skin from the tomato.

The loosened skin sections on either side of the tomato are completely removed therefrom by means of suction cups applied to opposite sides of the tomato when it is brought to rest therebetween by the conveyor 65. As best shown in Figs. 7 and 8, a pair of rubber suction cups 215 for removing the skin sections from the tomato are normally disposed in a retracted or withdrawn position so as to permit a tomato on the carrier to be positioned between them. After the conveyor has come to rest with a tomato disposed between the suction cups, movement of the operating rod 55 to its forward position shown in Fig. 5 will cause arms 216 (Fig. 7) pivoted at 217 to be moved inwardly toward the tomato on the conveyor. This movement of the arms 216 is effected by an element 218 secured to the operating rod 55 (Fig. 5) as illustrated and described in Buck Patent 2,703,124. Inward movement of the arms 216 will cause the suction cups 215 to be moved inwardly into engagement with the tomato. Also, as explained in Patent 2,703,124 to which reference is made for a detailed description of the construction and mode of operation of the suction devices, the final inward movement of the arms 216 will cause the cups to contract upon the tomato and provide an airtight seal therewith. The suction applied to the interior of the cups through tubes 219 causes the skin to be pulled off the tomatoes and drawn through the vacuum system, including tubes 219, into the vacuum tank hereinafter to be described. At its outer end, each tube 219 is connected to one branch of a T 220, the opposite, normally open end of which is closed by a flapper valve 221 pivoted at 222 (Fig. 12) on a bracket 223 attached to the body of the T 220. The valve 221 is normally held closed by a spring 224 tensioned between the valve and a suitable point on the machine frame. The third branch of each T is connected by a short section of pipe 225 (Fig. 8) with a vacuum tank 226 supported on the lower rails 22 and 23 of the machine frame. Air is continuously exhausted from the interior of the vacuum tank 226 by means of a vacuum pump 227 mounted on one end of the tank and driven by electric motor 35 through a V-belt 228 running on a pulley fastened to the shaft 36. The reduced pressure in the tank is communicated, without interruption, to the suction cups 215 through the pair of short pipes 225 and the pair of tubes 219.

With suction continuously applied to the cups 215, there is a tendency on the part of the cups to dislodge the tomato from the conveyor when the cups move apart upon return movement of the operating rod 55 toward the rear of the machine. This is due to the tendency of one or the other of the cups to hold on to the tomato as the cups move apart thereby pulling the tomato off to one side of the conveyor. To overcome this tendency, the flapper valve 221 is provided on the ends of the T's 221 to vent the suction cups to atmosphere and break the vacuum thereon when the cups commence to separate upon return movement of the operating rod 55.

As shown in Fig. 12 and as previously described in Patent 2,703,124, the forked ends of the arms 216 are each provided with an elongated slot 230 which engages over pins 231 provided on opposite sides of a split collar 232 clamped to an inner sleeve 233 slidable on the tube 219. In this way, movement of the arms 216 by operating rod 55 is transmitted to the sleeves 233. The vacuum cups 215 are each secured to an outer sleeve 234 which is slidably mounted on the inner sleeve 233. Each collar 232 has pivoted thereon at 235 a dog 236 the end of which, as shown in Fig. 12, normally engages against the end of the outer sleeve 234 to hold it in spaced relation with respect to the collar 232. The dog 236 is provided with a short crank arm 237 which is pivotally connected with one end of a stop rod 238 the other end of which passes through an aperture provided in a lug 239 projecting from the side of the T 220. The end of the rod 238 is threaded and carries a pair of stop nuts 240 which are adapted to engage with the lug 239 and limit inward movement of the rod 238. A compression spring 241 urges the rod 238 inwardly or to the left as viewed in Fig. 12. The threaded end of the rod 238 beyond the nuts 240 is positioned opposite the head of an adjustment screw 242 carried by the flapper valve 221.

In Fig. 12, the arm 216 is shown in an intermediate position in which the suction cup 215 has been given its full movement inwardly toward the tomato on the conveyor. As the arm 216 continues to move toward the left as viewed in Fig. 12, the nuts 240 bearing against the lug 239 will prevent further movement of the rod 238 to the left thereby causing the dog 236 to rock clockwise about its pivot 235 so as to remove the nose of the dog from against the end of the sleeve 234 and permit outer sleeve 234 to remain stationary while inner sleeve 233 continues to move inwardly with continued movement of the arm 216. This relative movement between the sleeves causes the cup 215 to contract on the tomato and to effect a tight seal between the cup and the tomato. The suction applied to the cup through the tube 219 causes the skin to be withdrawn from the tomato and the arm 216 is then moved outwardly upon return, rearward movement of the operating rod 55. As the arm 216 moves toward the right in Fig. 12, the rod 238 will be moved to the right compressing the spring 241 and causing the valve 221 to be opened by engagement of the end of the rod 238 with the screw 242. Opening of the valve 221 immediately breaks the vacuum in the tube 219 and its related suction cup 215 thereby releasing the tomato and permitting the cup to be retracted without any dislodgement of the tomato on the conveyor. When the arm 216 again moves inwardly upon forward movement of the operating rod 55, left-hand movement of the rod 238 allows the spring 224 to close flapper valve 221 to restore the suction to the cup 215 in preparation for removal of the skin section from the next tomato. Also, due to the short length of the pipe 225 which connects the suction cup devices with the vacuum tank 226, the time required for the vacuum in the tank to be applied to the suction cup after the flapper valves 221 are closed is negligible and rapid operation of the vacuum operated skin removing apparatus of the machine is enabled.

While the invention has been described herein in connection with a particular form or embodiment thereof and have used, therefore, certain specific terms and language herein, it is to be understood that the present disclosure is illustrative rather than restrictive and that changes and modifications may be resorted to without departing from the spirit or scope of the claims which follow.

Having thus described my invention, what I claim as new and useful, and desire to secure by United States Letters Patent, is:

1. A tomato processing machine comprising a conveyor for moving the individual tomatoes seriatim through the machine, a rotating knife positioned above said conveyor for slicing off the top of each tomato as it moves beneath the knife, a vertically movable shaft on which the knife is mounted, and means movable with the shaft for automatically adjusting the vertical position of the knife in accordance with the size of each tomato passing thereunder so as to cause slices of uniform thickness to be removed from each tomato passing through the machine.

2. A tomato processing machine comprising a conveyor for moving the individual tomatoes seriatim through the machine, a rotating knife positioned above said conveyor for removing a slice from the top of each tomato as it passes beneath the knife, said knife being movable from a lower position to a raised position, a vertical movable shaft on which the knife is mounted for being moved and means movable with said knife and shaft and adapted to be engaged by each tomato as it passes thereunder to raise the knife and cause a slice of predetermined thickness to be removed from the top of the tomato.

3. A tomato processing machine comprising a conveyor for carrying the individual tomatoes seriatim through the machine, a pair of spaced, rotary knives so located with respect to said conveyor as to remove a slice from the opposite sides of each tomato as it is carried through the machine on said conveyor, and a verticaly movable shaft on which one of the knives is mounted.

4. The machine of claim 3 including a common drive means for both knives, and means for automatically adjusting the vertically movable shaft spacing between said knives in accordance with the size of the individual tomatoes passing therebetween so as to cause slices of uniform thickness to be removed from each tomato regardless of its size.

5. In a tomato processing machine, the combination of a conveyor comprised of a pair of parallel, spaced chains connected at intervals by a series of upstanding, pocket forming straps, each strap being adapted to accommodate a singe tomato and to move the tomato through the machine on said chains, a pair of spaced, knives rotatable about a common vertical axis, one of said knives being disposed between the chains of said conveyor and the other of said knives lying above said straps, a common drive means for rotating said knives, and means for moving one of the knives along its vertical axis for automatically adjusting the spacing between said knives in accordance with the size of the individual tomatoes passing therebetween so as to cause slices of uniform thickness to be removed from each tomato passing through the machine.

6. A tomato processing machine comprising a conveyor for moving the individual tomatoes seriatim through the machine, a frame mounted above said conveyor for up and down movement relative thereto, a knife mounted in said frame for rotation about a substantially vertical axis, means for rotating said knife in all positions of said frame, and means on said frame adapted to be engaged by each tomato as it passes thereunder so as to raise the frame and knife and cause a slice of predetermined thickness to be removed from each tomato passing through the machine.

7. The machine of claim 6 wherein said last-mentioned means includes a blade engageable with the top of each tomato as it passes beneath the frame, and means for adjusting the elevation of said blade relative to said frame to determine the thickness of the slice to be removed by this knife.

8. A tomato processing machine comprising a float tank for receiving the tomatoes to be processed, a conveyor for transporting the tomatoes from said tank through the machine, said conveyor having an upwardly inclined reach leading from said tank to remove the tomatoes therefrom, and a horizontal reach leading from the upper end of the inclined reach through the processing apparatus of the machine, intermittent drive means for advancing said conveyor step-by-step through the machine, and a series of devices disposed adjacent the conveyor at the commencement of the horizontal reach thereof for applying pressure to the opposite sides of the tomatoes as they enter said reach to thereby restrain them from tilting forward on the conveyor each time the latter stops during its step-by-step movement.

9. The machine of claim 8 wherein each of said devices includes a pair of fingers pivotally supported on opposite sides of the conveyor, and spring means for biasing the free ends of said fingers toward one another.

References Cited in the file of this patent

UNITED STATES PATENTS

| | | |
|---|---|---|
| 1,122,859 | Chase et al. | Dec. 29, 1914 |
| 1,282,462 | Ricks | Oct. 22, 1918 |
| 1,441,844 | Garrett et al. | Jan. 9, 1923 |
| 1,657,775 | Ayars | Jan. 31, 1928 |
| 2,161,806 | Ewald | June 13, 1939 |
| 2,300,773 | Carroll | Nov. 3, 1942 |
| 2,491,950 | Bridge | Dec. 20, 1949 |
| 2,551,156 | Polk et al. | May 1, 1951 |
| 2,621,692 | Urschel et al. | Dec. 16, 1952 |
| 2,712,334 | Bridge | July 5, 1955 |
| 2,818,899 | De Back | Jan. 7, 1958 |

FOREIGN PATENTS

| | | |
|---|---|---|
| 650,653 | Great Britain | Feb. 28, 1951 |